US012512288B2

(12) United States Patent
Gibson

(10) Patent No.: US 12,512,288 B2
(45) Date of Patent: Dec. 30, 2025

(54) ELECTRICAL SWITCHING APPARATUS AND TRIP ASSEMBLY THEREFOR

(71) Applicant: EATON INTELLIGENT POWER LIMITED, Dublin (IE)

(72) Inventor: Jeffrey S. Gibson, Hookstown, PA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 18/753,624

(22) Filed: Jun. 25, 2024

(65) Prior Publication Data

US 2024/0347304 A1 Oct. 17, 2024

Related U.S. Application Data

(63) Continuation of application No. 16/037,507, filed on Jul. 17, 2018, now abandoned.

(51) Int. Cl.
*H01H 71/02* (2006.01)
*H01H 71/10* (2006.01)

(52) U.S. Cl.
CPC ........ *H01H 71/1009* (2013.01); *H01H 71/02* (2013.01)

(58) Field of Classification Search
CPC .... H01H 71/1009; H01H 71/02; H01H 71/04; H01H 71/52; H01H 9/24; H01H 71/2463
USPC .......................................................... 335/293
See application file for complete search history.

(56) References Cited

U.S. PATENT DOCUMENTS 2,876,308 A 3/1959 Christensen
2,923,795 A 2/1960 Martin
3,278,708 A * 10/1966 Casey .................. H01H 71/405 335/145
3,731,239 A 5/1973 Ellenberger
3,863,042 A 1/1975 Nicol
3,950,715 A * 4/1976 Bagalini .............. H01H 71/405 335/37

(Continued)

OTHER PUBLICATIONS

European Patent Office, "International Search Report and Written Opinion", from corresponding International (PCT) application No. PCT/EP2019/025232, Oct. 22, 2019, 9 pp.; previously cited in parent application, U.S. Appl. No. 16/037,507.

*Primary Examiner* — Shawki S Ismail
*Assistant Examiner* — Lisa N Homza
(74) *Attorney, Agent, or Firm* — Eckert Seamans Cherin & Mellott, LLC

(57) ABSTRACT

A trip assembly is for an electrical switching apparatus. The electrical switching apparatus has a base, a pair of separable contacts, and a trip bar structured to cooperate with the separable contacts in order to trip open the separable contacts. The trip assembly includes a housing member structured to be coupled to the base, and an lockout assembly having an actuation member and a locking member each coupled to the housing member. The actuation member is configured to engage the trip bar in order to trip open the separable contacts. The lockout assembly is structured to move between a FIRST position corresponding to the separable contacts being closed, and a SECOND position corresponding to the separable contacts being open. When the lockout assembly is in the SECOND position, the locking member engages the actuation member in order to maintain the separable contacts in the open position.

16 Claims, 7 Drawing Sheets

(56) References Cited

U.S. PATENT DOCUMENTS

| | | | | | |
|---|---|---|---|---|---|
| 4,146,855 | A * | 3/1979 | Schultz | H01H 71/50 335/8 |
| 4,211,989 | A * | 7/1980 | Acampora | H01H 71/46 335/170 |
| 4,650,944 | A * | 3/1987 | Tedesco | H01H 71/525 200/401 |
| 4,808,952 | A | 2/1989 | Berner et al. | |
| 5,258,733 | A | 11/1993 | Link et al. | |
| 5,608,367 | A * | 3/1997 | Zoller | H01H 71/7418 335/35 |
| 6,140,897 | A | 10/2000 | Mueller et al. | |
| 6,172,585 | B1 | 1/2001 | Zindler et al. | |
| 6,194,983 | B1 | 2/2001 | Bogdon et al. | |
| 6,274,833 | B1 * | 8/2001 | Moody | H01H 71/0228 335/35 |
| 7,012,493 | B1 | 3/2006 | Marks et al. | |
| 7,365,621 | B2 * | 4/2008 | Germain | H01H 83/04 361/42 |
| 8,334,739 | B2 | 12/2012 | Wan et al. | |
| 8,542,083 | B2 * | 9/2013 | Maloney | H01H 71/522 335/172 |
| 8,582,279 | B2 | 11/2013 | Maloney et al. | |
| 9,406,470 | B2 * | 8/2016 | Rakuff | H01H 50/645 |
| 9,466,451 | B2 | 10/2016 | Carlino et al. | |
| 9,679,730 | B2 | 6/2017 | Walsh et al. | |
| 2002/0030953 | A1 * | 3/2002 | Ziegler | H01H 83/04 361/42 |
| 2006/0071750 | A1 | 4/2006 | Douglas et al. | |
| 2006/0119344 | A1 | 6/2006 | Benke et al. | |
| 2007/0056338 | A1 | 3/2007 | Sabo et al. | |
| 2007/0200652 | A1 | 8/2007 | Gibson et al. | |
| 2010/0264928 | A1 * | 10/2010 | Zende | H01H 83/04 324/424 |
| 2012/0132506 | A1 | 5/2012 | Potratz | |
| 2013/0088310 | A1 * | 4/2013 | Yang | H01H 71/46 335/14 |
| 2015/0035628 | A1 | 2/2015 | Warne | |
| 2016/0181039 | A1 | 6/2016 | Ricciuti | |
| 2019/0189379 | A1 * | 6/2019 | Ostrovsky | H01H 1/0015 |

* cited by examiner

ELECTRICAL SWITCHING APPARATUS AND TRIP ASSEMBLY THEREFOR

This application is a continuation of U.S. Non-Provisional patent application Ser. No. 16/037,507, filed Jul. 17, 2018, the contents of which are incorporated by reference herein.

BACKGROUND

Field

The disclosed concept relates generally to electrical switching apparatus and, more particularly, to electric switching apparatus, such as for example, circuit breakers. The disclosed concept also relates to trip assemblies for circuit breakers.

Background Information

Electrical switching apparatus, such as molded case circuit breakers, generally include at least one pair of separable contacts which are operated either manually, by way of a handle disposed on the outside of the circuit breaker housing, or automatically by way of a trip mechanism in response to a trip condition (e.g., without limitation, an overcurrent condition; a relatively high level short circuit or fault condition; a ground fault or arc fault condition).

Numerous types of trip mechanisms exist and are often tailored to meet specific needs of particular applications. For example, it is common to have electrically actuated devices actuating or tripping the operating mechanism. A shunt trip actuator is a type of electronic trip mechanism, which can be actuated from a remote location. Shunt trip actuators typically include a spring to bias a plunger to an actuated position. Permanent magnets generate sufficient magnetic force to override the actuating force generated by this spring and hold the plunger in an unactuated, typically retracted, position. The actuating signal is applied to a coil to generate an electromagnetic force which overcomes the force generated by the permanent magnets. With the magnetic field at least partially attenuated, the spring actuates the plunger. Such shunt trip actuators must be reset.

Agency code requirements may include, for example, means for deenergizing electrical service to the residence under emergency circumstances (e.g., without limitation, fire) in order to eliminate dangerous exposure by responders to live voltages.

There is room for improvement in electrical switching apparatus and in trip assemblies therefor.

SUMMARY

These needs and others are met by embodiments of the invention, which are directed to an improved electrical switching apparatus and trip assembly therefor.

As one aspect of the disclosed concept, a trip assembly is provided for an electrical switching apparatus. The electrical switching apparatus has a base, a pair of separable contacts coupled to the base, and a trip bar coupled to the base and being structured to cooperate with the pair of separable contacts in order to trip open the pair of separable contacts. The trip assembly includes a housing member structured to be coupled to the base, and an lockout assembly comprising an actuation member and a locking member each coupled to the housing member. The actuation member is configured to engage the trip bar in order to trip open the pair of separable contacts. The lockout assembly is structured to move between a FIRST position corresponding to the separable contacts being in a closed position, and a SECOND position corresponding to the separable contacts being in an open position. When the lockout assembly is in the SECOND position, the locking member engages the actuation member in order to maintain the separable contacts in the open position.

As another aspect of the disclosed concept, an electrical switching apparatus is provided. The electrical switching apparatus includes a base, a pair of separable contacts coupled to the base, a trip bar coupled to the base and being structured to cooperate with the pair of separable contacts in order to trip open the pair of separable contacts, and the aforementioned trip assembly.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
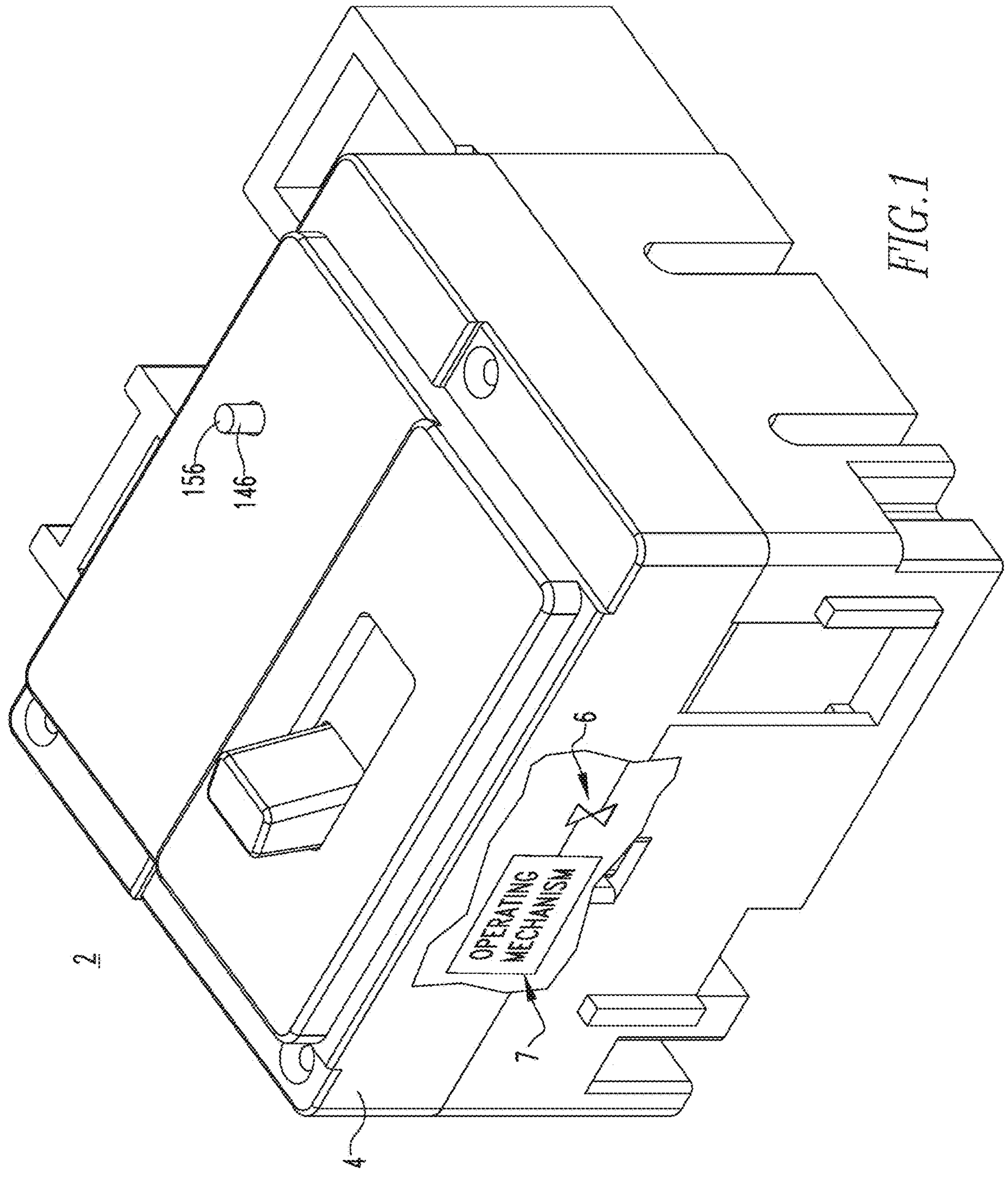
FIG. 1 is an isometric view of an electrical switching apparatus and trip assembly therefor, in accordance with one non-limiting embodiment of the disclosed concept.

For purposes of the description hereinafter, directional phrases used herein such as, for example "left", "right", "up", "down", "top", "bottom", "clockwise", "counterclockwise", and derivatives thereof shall relate to the disclosed concept, as it is oriented in the drawings. It is to be understood that the specific elements illustrated in the drawings and described in the following specification are simply exemplary embodiments of the disclosed concept. Therefore, specific orientations and other physical characteristics related to the embodiments disclosed herein are not to be considered limiting with respect to the scope of the disclosed concept.

As employed herein, the singular form of "a", "an", and "the" include plural references unless the context clearly dictates otherwise. Still further, as used herein, the term "number" shall mean one or an integer greater than one (e.g., a plurality).

As employed herein, the term "coupled" shall mean that two or more parts are joined together directly or joined through one or more intermediate parts. Furthermore, as employed herein, the phrase "directly connected" shall mean that two or more parts are joined together directly, without any intermediate parts being disposed therebetween at the point or location of the connection.

As employed herein, the phrase "electrically connected" shall mean that two or more parts or components are joined together either directly or joined through one or more intermediate parts such that electricity, current, voltage, and/or energy is operable to flow from one part or component to the other part or component, and vice versa.

Figure 2:
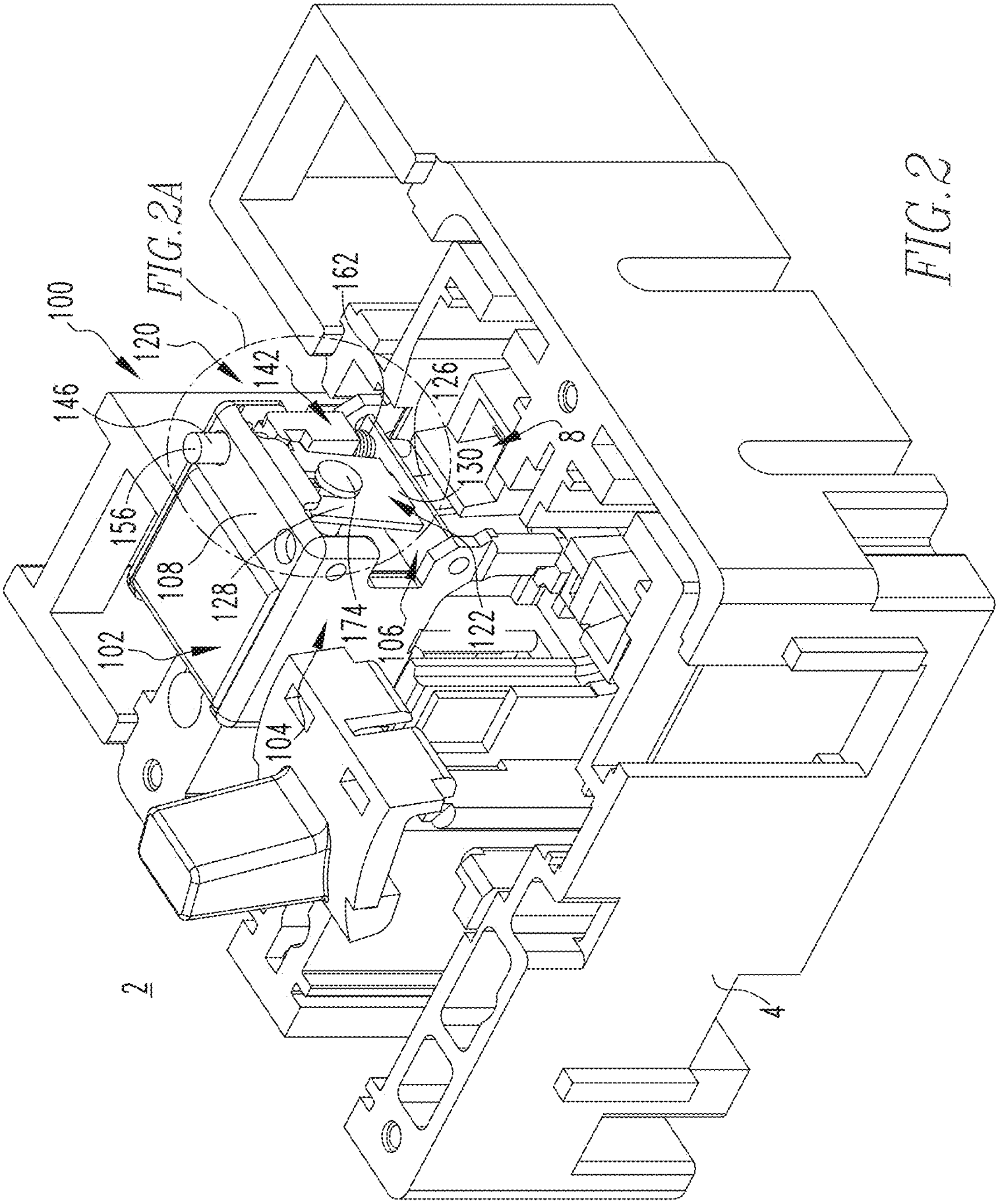
FIG. 2 is another isometric view of the electrical switching apparatus and trip assembly therefor of FIG. 1, shown with portions of the base removed in order to see hidden structures, and with a lockout assembly of the trip assembly in a FIRST position.
Figure 3:
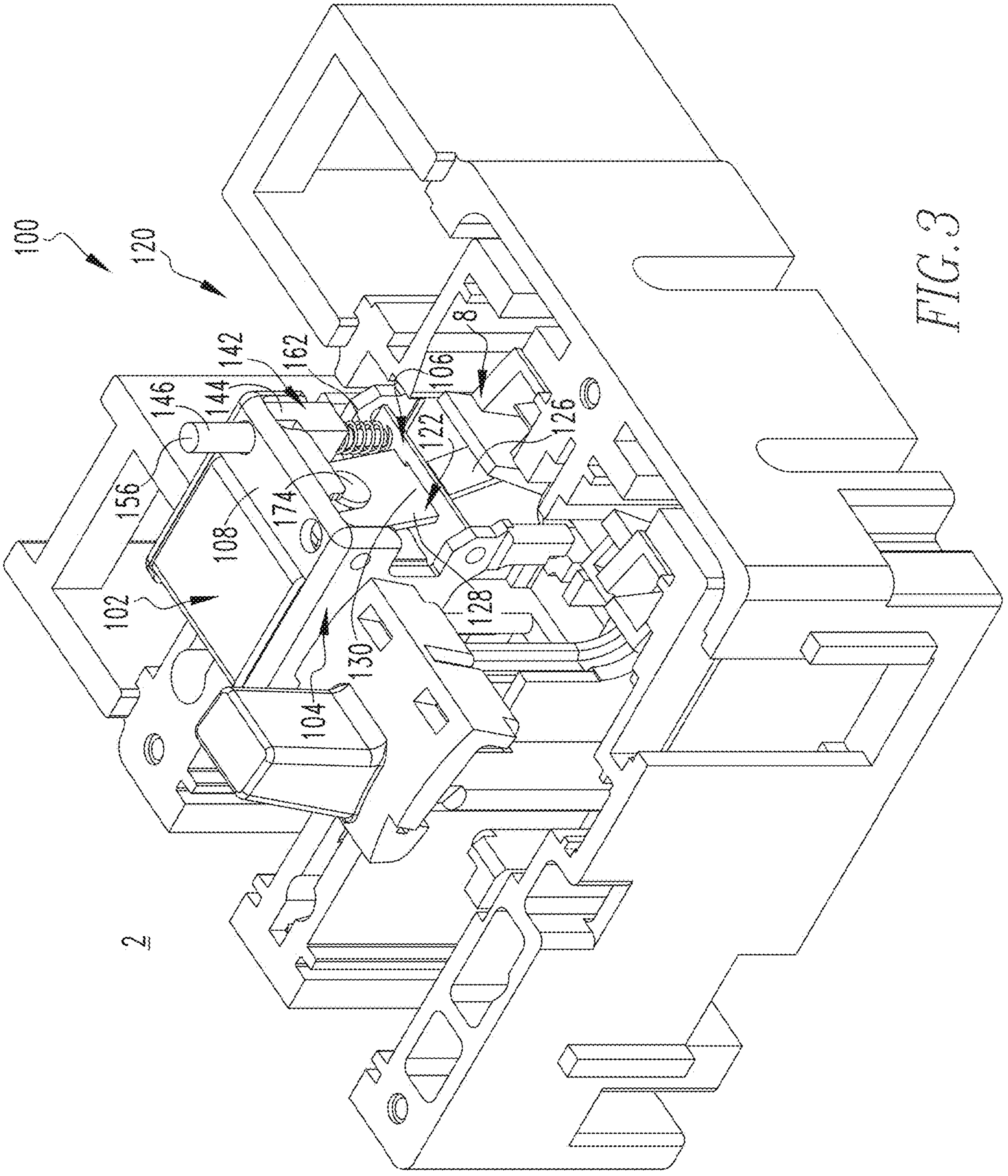
FIG. 3 is another isometric view of the electrical switching apparatus and trip assembly therefor of FIG. 2, shown with the lockout assembly of the trip assembly moved to a SECOND position.

FIG. 1 is an isometric view of an electrical switching apparatus (e.g., without limitation, circuit breaker 2), in accordance with one non-limiting embodiment of the disclosed concept. The circuit breaker 2 includes a base 4, a pair of separable contacts 6 (shown in simplified form) coupled to the base 4, and an operating mechanism 7 (shown in simplified form) for opening and closing the separable contacts 6. FIGS. 2 and 3 show additional isometric views of the circuit breaker 2, each with portions of the base 4 removed in order to see hidden structures. As shown, the circuit breaker 2 further includes a trip bar 8 coupled to the base 4, and a novel trip assembly 100. The trip bar 8 is structured to trip open the separable contacts 6 (FIG. 1) in response to actuation by the trip assembly 100, as will be discussed below. As will also be discussed in greater detail below, the trip assembly 100 provides a novel mechanism through which after tripping, the circuit breaker 2 will be locked such that the separable contacts 6 remain open unless an operator manually resets the circuit breaker 2.

As shown in FIGS. 2 and 3, the trip assembly 100 includes a housing member 104 and a lockout assembly 120. The trip assembly 100 also includes a frame member (e.g., solenoid frame 102) and a plate member 106 each coupled to the housing member 104. The housing member 104 is coupled to the base 4, and has a distal surface 108 located opposite and distal the plate member 106. The lockout assembly 120 has an actuation member 122 and a locking member 142 each coupled to the housing member 104.

Figure 4:
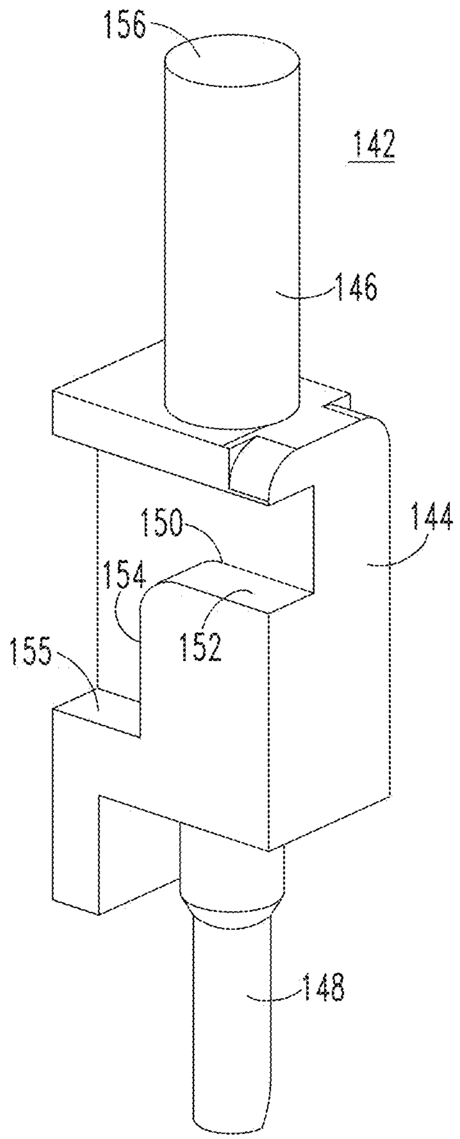
FIG. 4 is an isometric view of a locking member for the trip assembly of FIG. 3.

FIG. 4 shows an isometric view of the locking member 142, which includes a body portion 144, a cylindrical-shaped indication portion 146 extending from the body portion 144, and an extension portion 148 extending from the body portion 144 away from the indication portion 146. The body portion 144 has a retention feature in the form of a grooved region 150. For purposes that will be more apparent below, the grooved region 150 has a first surface 152, a second surface 154 extending from and being located substantially perpendicular to the first surface 152, and a third surface 155 extending from and being located substantially perpendicular to the second surface 154, and spaced from the first surface 152. Furthermore, the indication portion 146 has an end portion 156 located opposite and distal from the body portion 144.

Figure 5:
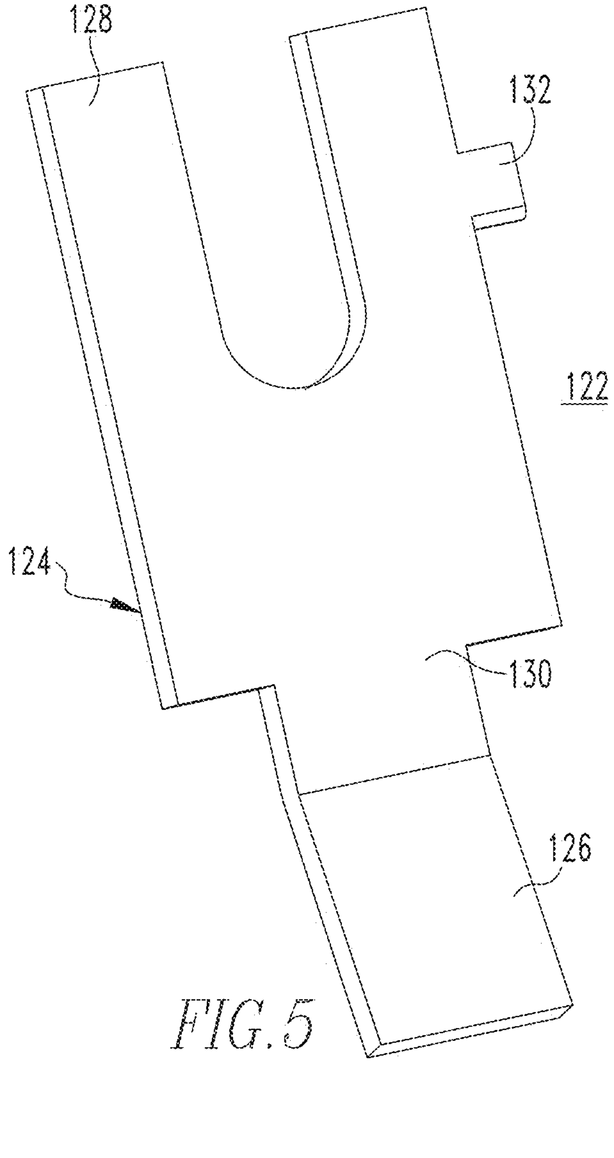
FIG. 5 is an isometric view of an actuation member for the trip assembly of FIG. 3.

FIG. 5 shows an isometric view of the actuation member 122, which includes a body portion 124 having a tail portion 126, a generally fork-shaped latching portion 128, and a middle region 130 located between the tail portion 126 and the latching portion 128. As shown in FIG. 5, the actuation member 122 further includes a retention feature in the form of a protrusion 132 extending outwardly from the latching portion 128.

Figure 6:
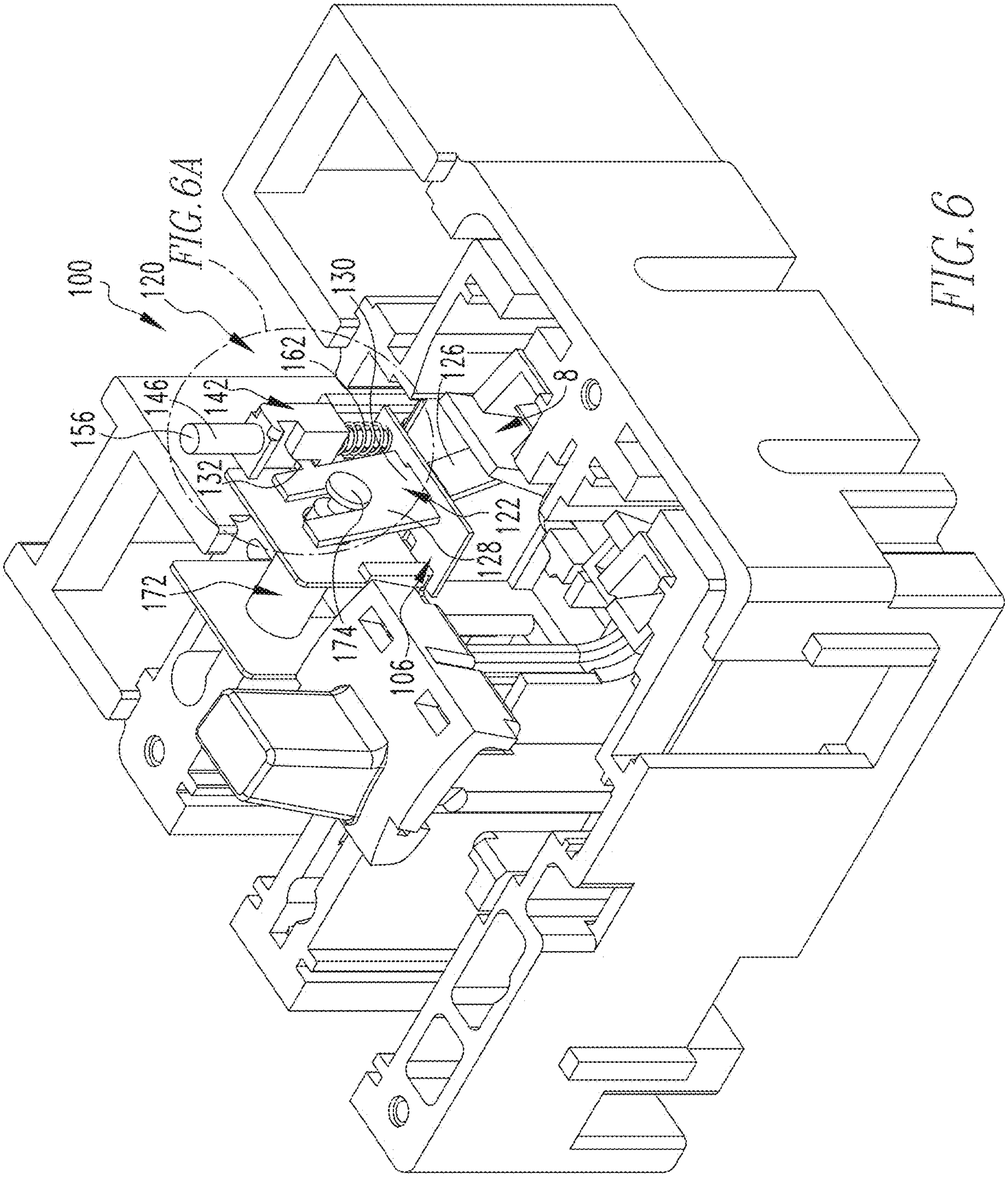
FIG. 6 is another isometric view of the electrical switching apparatus and trip assembly therefor of FIG. 3, shown with portions of the trip assembly removed in order to see hidden structures.

FIG. 6 shows another isometric view of the circuit breaker 2, and shown with additional portions (e.g., the solenoid frame 102 and the housing member 104) removed in order to see hidden structures. Specifically, it will be appreciated that the lockout assembly 120 further includes a driving member (e.g., without limitation, solenoid 172 (partially shown in FIG. 6)), and a plunger 174 extending outwardly from the solenoid 172. Additionally, for reasons that will be described below, the plunger 174 is located between and engages opposing legs of the latching portion 128 of the actuation member 122. Moreover, comparing FIGS. 2 and 3 to FIG. 6, it will be appreciated that the solenoid 172 (FIG. 6) is located internal and is coupled to the housing member 104.

Continuing to refer to FIGS. 2, 3, and 6, the lockout assembly 120 is structured to move between a FIRST position (FIG. 2) corresponding to the separable contacts 6 being in a closed position and a SECOND position (FIGS. 3 and 6) corresponding to the separable contacts 6 being in an open position. In order to move between positions (e.g., to trip open), the circuit breaker 2 may be communicable with a remotely wired, manually operated switch (not shown). For example and without limitation, the switch (not shown) may be located external the circuit breaker 2 and electrically connected (e.g., via wires) to the solenoid 172 in order to actuate the solenoid 172 and thus trip open the separable contacts 6 (FIG. 1). In turn, when the solenoid 172 is caused to fire, the solenoid 172 pulls the plunger 174 inwardly. As such, when the lockout assembly 120 moves from the FIRST position (FIG. 2) toward the SECOND position (FIGS. 3 and 6), the solenoid 172 drives the plunger 174, thereby pulling a portion of the actuation member 122 toward the solenoid 172 and allowing the locking member 142 to move linearly along a longitudinal axis.

More specifically, as shown in FIGS. 2, 3, and 6, the lockout assembly 120 further includes a biasing element (e.g., compression spring 162) coupled to the locking member 142. The extension portion 148 (FIG. 4) of the locking member 142 extends through the spring 162 to maintain the spring 162 in position.

Figure 2A:
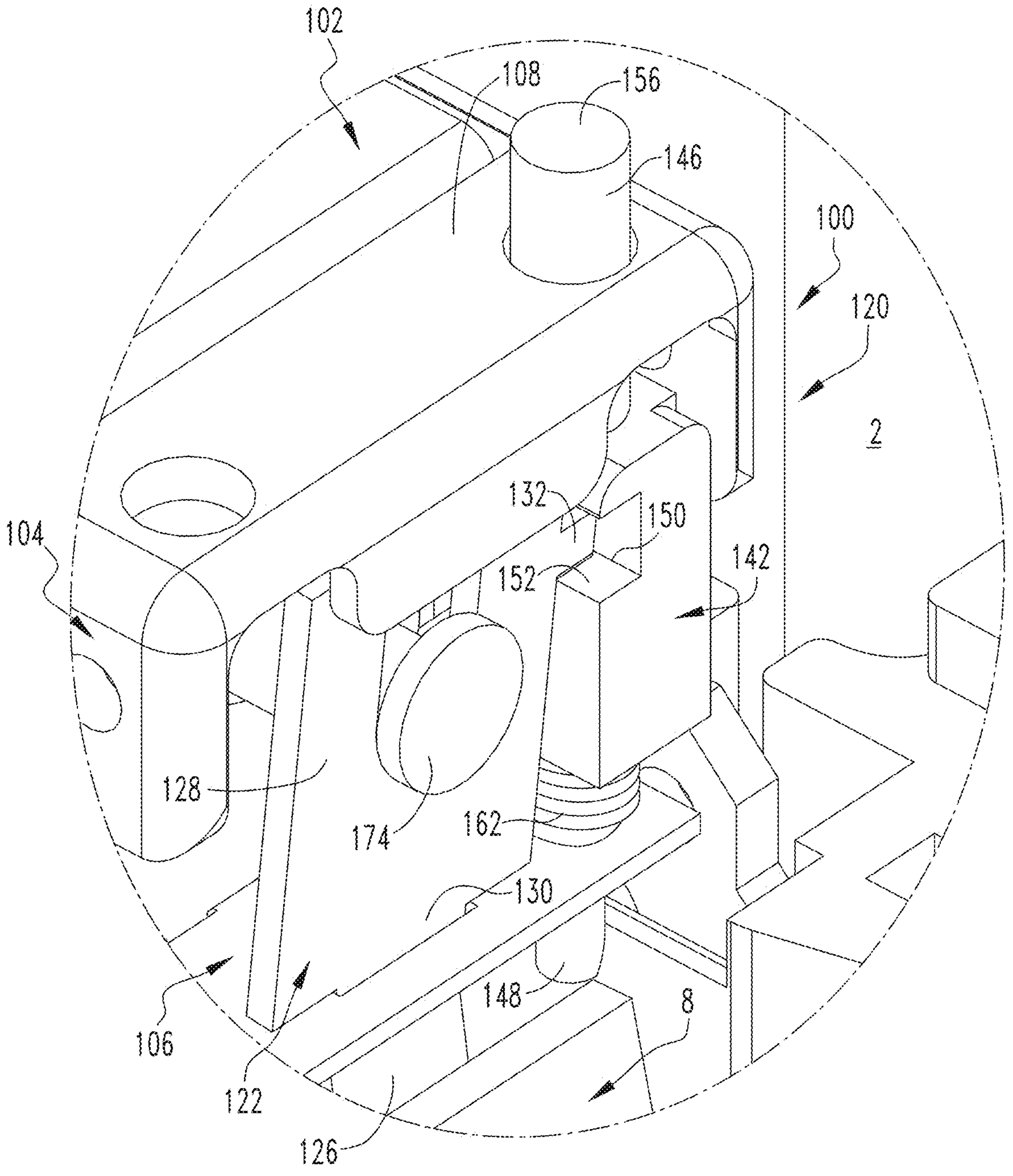
FIG. 2A is an enlarged view of a portion of the electrical switching apparatus and trip assembly therefor of FIG. 2.

Referring to FIGS. 2 and 2A, when the lockout assembly 120 is in the FIRST position, the protrusion 132 of the actuation member 122 extends into and engages the grooved region 150. As shown more clearly in FIG. 2A, the protrusion 132 is engaged with the first surface 152 of the grooved region 150, and is generally maintained in that position by two features of the trip assembly 100. First, as shown most clearly in FIG. 6, a distal end of the plunger 174 is generally maintained at a fixed location with respect to the latching portion 128. As such, when the plunger 174 is extended (FIGS. 2 and 2A), the protrusion 132 stays extended, and thus engaged with the first surface 152 of the grooved region 150, until a change in operating conditions (e.g., a trip condition). Second, in the position of FIGS. 2 and 2A, the spring 162 is biasing the first surface 152 of the grooved region 150 in the upward direction (i.e., from the perspective of FIGS. 2 and 2A) and thus toward engagement with the protrusion 132. Accordingly, when the lockout assembly 120 is in the FIRST position, the protrusion 132 extends into and engages the grooved region 150 (e.g., engages the first surface 152) in order to maintain the locking member 142 in the FIRST position.

However, as stated above, the lockout assembly 120 is structured to move to the SECOND position (FIGS. 3 and 6). When the solenoid 172 (FIG. 6) fires and pulls the plunger 174 (FIG. 6) inwardly, the actuation member 122 rotates. It will be appreciated that the plate member 106 has a slot, that the tail portion 126 is located on a first side of the slot, and the latching portion 128 is located on a second side of the slot. When the lockout assembly 120 moves from the FIRST position toward the SECOND position, the actuation member 122 rotates about the slot in the plate member 106. As such, when the lockout assembly 120 moves from the FIRST position toward the SECOND position, the actuation member 122 rotates about the middle region 130, thereby allowing the locking member 142 to move linearly on a longitudinal axis. In this manner, the tail portion 126 of the actuation member 122 is configured to engage the trip bar 8 in order to trip open the separable contacts 6.

Figure 6A:
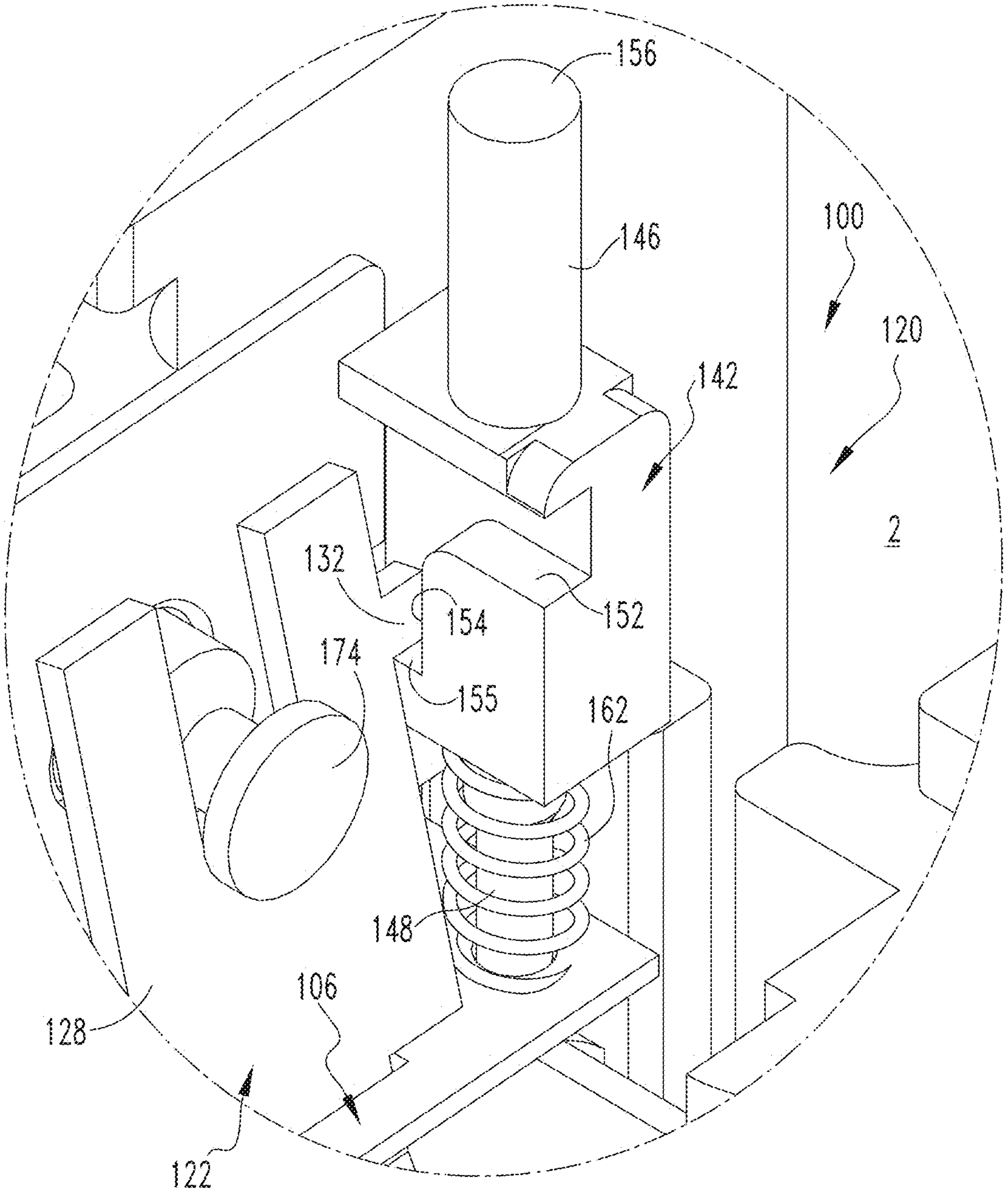
FIG. 6A is an enlarged view of a portion of the electrical switching apparatus and trip assembly therefor of FIG. 6.

In accordance with the disclosed concept, while the tail portion 126 is cooperating with the trip bar 8 to trip open the separable contacts 6 (FIG. 1), the protrusion 132 is being caused to rotate off of the first surface 152 of the grooved region 150. Compare, for example, the position of the protrusion 132 in FIGS. 2 and 2A, to the position of the protrusion 132 in FIGS. 6 and 6A. As shown in FIG. 6A, the protrusion 132 has been moved into engagement with the third surface 155. It will be appreciated that once the protrusion 132 is rotated off of the first surface 152, the spring 162 is uninhibited from driving the locking member 142 upwards. That is, when the lockout assembly 120 moves from the FIRST position toward the SECOND position, the spring 162 drives the locking member 142 toward the SECOND position. Accordingly, when the lockout assembly 120 moves from the FIRST position toward the SECOND position, the protrusion 132 rotates out of engagement with the first surface 152 and into engagement with the third surface 155, thereby releasing the locking member 142 and allowing the locking member 142 to move to the SECOND position. With the tail portion 126 of the actuation member 122 extended into engagement with the trip bar 8, the separable contacts 6 are maintained (e.g., locked) in the open position.

Specifically, it will be appreciated with reference to FIGS. 3, 6, and 6A that generally the only practical way in which the separable contacts 6 (FIG. 1) may be closed is if the actuation member 122 is caused to rotate about the slot in the plate member 106, and in the clockwise direction (i.e. from the orientation of FIGS. 3 and 6). However, as shown most clearly in FIGS. 6 and 6A, the locking member 142, which is biased upwards by the spring 162, inhibits such a motion. Specifically, any attempted motion by the actuation member 122 in the clockwise direction will result in the protrusion 132 almost immediately engaging the second surface 154 of the grooved region 150, thereby preventing the tail portion 126 from releasing the trip bar 8, and thus maintaining the separable contacts 6 (FIG. 1) in an open position. As such, when the lockout assembly 120 is in the SECOND position, the locking member 142 engages the actuation member 122 in order to maintain the separable contact 6 (FIG. 1) in the open position. Furthermore, while the disclosed concept has been described herein in association with the actuation member 122 having a protrusion 132 and the locking member 142 having a grooved region 150, it will be appreciated that suitable alternative interacting mechanisms (e.g., without limitation, an actuation member having a grooved region and a locking member having a protrusion, not shown) are contemplated herein.

Additionally, it will be appreciated that while FIRST and SECOND positions have been described herein, the circuit breaker 2 has other positions. For example, while movement from the FIRST position to the SECOND position was generally described herein in association with tripping via the solenoid 172, manual opening of the separable contacts 6 (FIG. 1) would present with the separable contacts 6 being open, but with the trip assembly 100 being in the position depicted in FIGS. 2 and 2A.

Certain residential code proposals may require an exterior means for deenergizing electrical service to the residence under emergency situations (e.g., fire) in order to eliminate exposure of responders to live voltages. Accordingly, the circuit breaker 2 performs this function via the aforementioned tripping capabilities, and further functions to lock the circuit breaker 2 once it has tripped, thus maintaining the separable contacts 6 (FIG. 1) of the circuit breaker 2 in an open position. As such, operators who might be within a relatively close proximity of the circuit breaker 2 will have an additional mechanism to substantially minimize the likelihood and/or prevent any inadvertent reenergizing of the circuit breaker 2. More specifically, it can be appreciated that unless the indication portion 146 of the locking member 142 is depressed downwardly, the interference between the protrusion 132 of the actuation member 122 and the grooved region 150 of the locking member 142 functions to maintain the lockout assembly 120 in the SECOND position, a position which protects operators because the circuit breaker 2 is deenergized.

Additionally, the circuit breaker 2 provides a mechanism to indicate that the separable contacts 6 (FIG. 1) have tripped. Compare, for example, the position of the end portion 156 of the indication portion 146 in FIGS. 2 and 3. As shown, the indication portion 146 extends through the distal surface 108. When the lockout assembly 120 is in the FIRST position (FIGS. 2 and 2A), the end portion 156 of the indication portion 146 is spaced a first distance from the distal surface 108. When the lockout assembly 120 is in the SECOND position, the end portion 156 of the indication portion 146 is spaced a second distance from the distal surface 108, the second distance being greater than the first distance. As also shown in FIG. 2, the extension portion 148 of the locking member 142 extends through the plate member 106, thereby further aiding in positioning the locking member 142 in the trip assembly 100.

Accordingly, it will be appreciated that the disclosed concept provides for an improved (e.g., without limitation, safer) electrical switching apparatus 2 and trip assembly 100 therefor, in which a lockout assembly 120 of the trip assembly 100 allows separable contacts 6 of the electrical switching apparatus 2 to be maintained (e.g., locked) in an open position, thereby protecting operators who may be near the electrical switching apparatus 2.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A trip assembly for an electrical switching apparatus, said electrical switching apparatus comprising a base, a pair of separable contacts coupled to said base, and a trip bar coupled to said base and being structured to trip open said pair of separable contacts, said trip assembly comprising:

a housing member structured to be coupled to said base; and a lockout assembly comprising an actuation member and a locking member each coupled to said housing member, said actuation member being configured to engage said trip bar in order to trip open said pair of separable contacts, wherein said lockout assembly is structured to move between a FIRST position corresponding to said separable contacts being in a closed position, and a SECOND position corresponding to said separable contacts being in an open position, wherein, when said lockout assembly is in the SECOND position, said locking member engages said actuation member in order to maintain said separable contacts in the open position, wherein said actuation member has a first retention feature, wherein said locking member has a second retention feature, wherein, when said lockout assembly is in the FIRST position, said first retention feature engages said second retention feature in order to maintain said locking member in the FIRST position, wherein said actuation member comprises a body portion having a tail portion, a latching portion, and a middle region extending therebetween, and wherein, when said lockout assembly moves from the FIRST position toward the SECOND position, said actuation member rotates about said middle region, thereby allowing said locking member to move linearly on a longitudinal axis.

2. The trip assembly of claim 1, wherein said first retention feature is a protrusion extending outwardly from said body portion, wherein said locking member comprises a body portion, wherein said second retention feature is a grooved region in said body portion of said locking member, and wherein, when said lockout assembly is in the FIRST position, said protrusion extends into and engages said grooved region in order to maintain said locking member in the FIRST position.

3. The trip assembly of claim 2, wherein said grooved region comprises a first surface, a second surface extending from and being disposed substantially perpendicular to said first surface, and a third surface extending from and being disposed substantially perpendicular to said second surface, and spaced from said first surface, wherein, when said lockout assembly is in the FIRST position, said protrusion engages said first surface, and wherein, when said lockout assembly moves from the FIRST position toward the SECOND position, said protrusion rotates out of engagement with the first surface and into engagement with the third surface, thereby releasing said locking member and allowing said locking member to move to the SECOND position.

4. The trip assembly of claim 2, wherein said lockout assembly further comprises a biasing element coupled to said locking member, and wherein, when said lockout assembly moves from the FIRST position toward the SECOND position, said biasing element drives said locking member toward the SECOND position.

5. The trip assembly of claim 2, wherein said body portion of said actuation member has a tail portion, a latching portion, and a middle region disposed between said tail portion and said latching portion, wherein said trip assembly further comprises a plate member coupled to said housing member, wherein said plate member has a slot, wherein said tail portion is disposed on a first side of the slot and said latching portion is disposed on a second side of the slot, and wherein, when said lockout assembly moves from the FIRST position toward the SECOND position, said actuation member rotates about the slot.

6. The trip assembly of claim 1, wherein said lockout assembly further comprises a driving member and a plunger extending outwardly from said driving member, wherein said driving member is disposed internal and is coupled to said housing member, wherein said plunger engages said actuation member, and wherein, when said lockout assembly moves from the FIRST position toward the SECOND position, said driving member drives said plunger, thereby pulling a portion of said actuation member toward said driving member and allowing said locking member to move linearly on the longitudinal axis.

7. The trip assembly of claim 6, wherein said driving member is a solenoid.

8. The trip assembly of claim 1, wherein said trip assembly further comprises a plate member coupled to said housing member, wherein said housing member is structured to be coupled to said base, wherein said housing member has a distal surface disposed opposite and distal said plate member, wherein said actuation member extends through said plate member, and wherein said locking member extends through said distal surface.

9. The trip assembly of claim 8, wherein said locking member comprises a body portion and an indication portion extending from said body portion, wherein said indication portion has an end portion disposed opposite and distal said body portion of said locking member, wherein, when said lockout assembly is in the FIRST position, said end portion is spaced a first distance from said distal surface, and wherein, when said lockout assembly is in the SECOND position, said end portion is spaced a second distance from said distal surface, the second distance being greater than the first distance.

10. The trip assembly of claim 8, wherein said locking member extends through said plate member.

11. An electrical switching apparatus comprising:

a base;

a pair of separable contacts coupled to said base;

a trip bar coupled to said base and being structured to trip open said pair of separable contacts; and a trip assembly comprising:

a housing member coupled to said base, and a lockout assembly comprising an actuation member and a locking member each coupled to said housing member, said actuation member being configured to engage said trip bar in order to trip open said pair of separable contacts, wherein said lockout assembly is structured to move between a FIRST position corresponding to said separable contacts being in a closed position, and a SECOND position corresponding to said separable contacts being in an open position, wherein, when said lockout assembly is in the SECOND position, said locking member engages said actuation member in order to maintain said separable contacts in the open position, wherein said lockout assembly further comprises a driving member and a plunger extending outwardly from said driving member, wherein said driving member is coupled to said housing member, wherein said plunger engages said actuation member, and wherein, when said lockout assembly moves from the FIRST position toward the SECOND position, said driving member drives said plunger, thereby pulling a portion of said actuation member toward said driving member, wherein said actuation member comprises a body portion having a tail portion, a latching portion, and a middle region extending therebetween, and wherein, when said lockout assembly moves from the FIRST position toward the SECOND position, said actuation member rotates about said middle region, thereby allowing said locking member to move linearly on a longitudinal axis.

12. The electrical switching apparatus of claim 11, wherein said actuation member has a first retention feature, wherein said locking member has a second retention feature, and wherein, when said lockout assembly is in the FIRST position, said first retention feature engages said second retention feature in order to maintain said locking member in the FIRST position.

13. The electrical switching apparatus of claim 12, wherein said first retention feature is a protrusion extending outwardly from said body portion, wherein said locking member comprises a body portion, wherein said second retention feature is a grooved region in said body portion of said locking member, and wherein, when said lockout assembly is in the FIRST position, said protrusion extends into and engages said grooved region in order to maintain said locking member in the FIRST position.

14. The electrical switching apparatus of claim 13, wherein said grooved region comprises a first surface, a second surface extending from and being disposed substantially perpendicular to said first surface, and a third surface extending from and being disposed substantially perpendicular to said second surface, and spaced from said first surface, wherein, when said lockout assembly is in the FIRST position, said protrusion engages said first surface, and wherein, when said lockout assembly moves from the FIRST position toward the SECOND position, said protrusion rotates out of engagement with the first surface and into engagement with the third surface, thereby releasing said locking member and allowing said locking member to move to the SECOND position.

15. The electrical switching apparatus of claim 11, wherein said trip assembly further comprises a plate member coupled to said housing member, wherein said housing member is coupled to said base, wherein said housing member has a distal surface disposed opposite and distal said plate member, wherein said actuation member extends through said plate member, and wherein said locking member extends through said distal surface.

16. The electrical switching apparatus of claim 15, wherein said locking member comprises a body portion and an indication portion extending from said body portion, wherein said indication portion has an end portion disposed opposite and distal said body portion of said locking member, wherein, when said lockout assembly is in the FIRST position, said end portion is spaced a first distance from said distal surface, and wherein, when said lockout assembly is in the SECOND position, said end portion is spaced a second distance from said distal surface, the second distance being greater than the first distance.

* * * * *